April 1, 1952   L. L. WITTER ET AL   2,591,327
EDUCATIONAL DEVICE

Filed Feb. 5, 1949   4 Sheets-Sheet 1

INVENTORS
L. L. Witter & O. R. Deckert
BY Lawrie L. Witter
Attorney

April 1, 1952 L. L. WITTER ET AL 2,591,327
EDUCATIONAL DEVICE
Filed Feb. 5, 1949 4 Sheets-Sheet 2

INVENTORS
L. L. Witter & C. R. Deckert
BY Lawrie L. Witter
Attorney

April 1, 1952 — L. L. WITTER ET AL — 2,591,327
EDUCATIONAL DEVICE
Filed Feb. 5, 1949 — 4 Sheets-Sheet 3
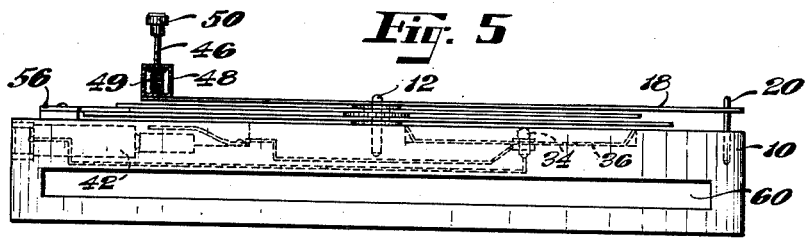
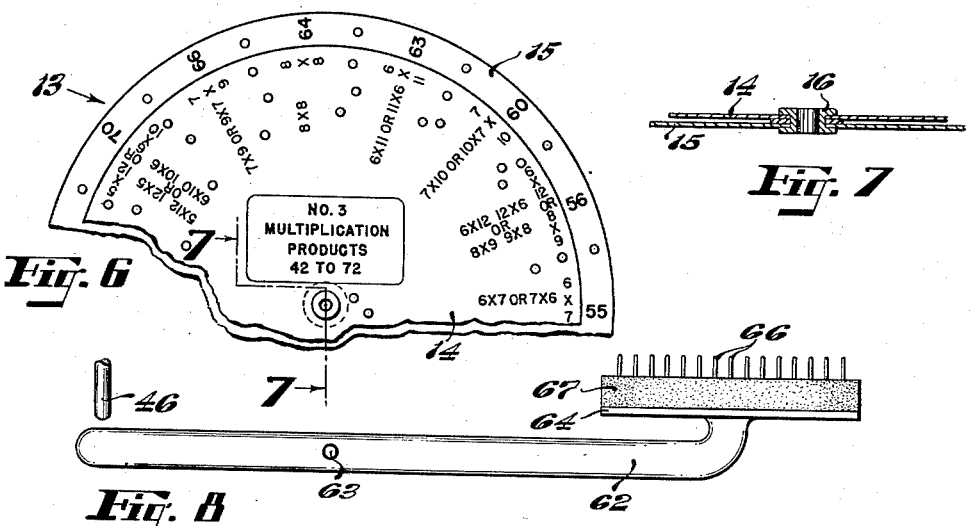
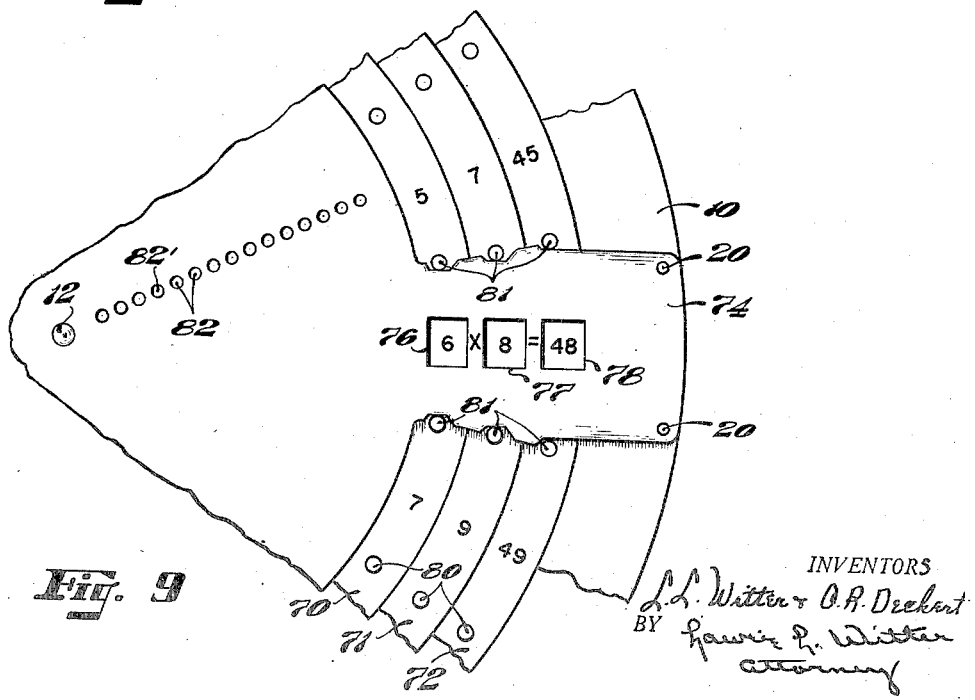
INVENTORS
L. L. Witter & O. R. Deckert
BY Lawrie L. Witter
Attorney April 1, 1952 — L. L. WITTER ET AL — 2,591,327
EDUCATIONAL DEVICE
Filed Feb. 5, 1949 — 4 Sheets-Sheet 4

INVENTORS
L. L. Witter & O. R. Deckert
BY Laurie L. Witter
Attorney

Patented Apr. 1, 1952

2,591,327

UNITED STATES PATENT OFFICE 2,591,327

EDUCATIONAL DEVICE

Lawrie L. Witter, Newton Highlands, and Oscar Robert Deckert, Newtonville, Mass.

Application February 5, 1949, Serial No. 74,793

13 Claims. (Cl. 35—9)

This invention relates to educational devices particularly adapted to teach multiplication, addition and the like. The device embodies a windowed shield having a plurality of sheets therebeneath and provided thereon with a plurality of problems and answers so disposed that selected problems and answers can be brought into exposed and aligned relation by moving the sheets along a predetermined path. Further means, including small windows in the shield and sheets, is provided for giving a signal only when a corresponding answer and problem are brought into said aligned relation. The production of a novel and relatively simple device of this nature and for the purpose described comprises the primary object of the invention.

A signal producing means auxiliary to and associated with the small windows is preferably employed and preferably includes a manually operated switch or the like. The arrangement is such that the operator first sets up a problem and his answer thereto, and then operates the switch. If the answer is correct, a signal, preferably in the form of an electric light, results.

The invention is particularly applicable to teaching the multiplication table by combining the factors which, from the ones to the twelves, contain fifty-nine products. The invention, in its preferred form, provides for displaying all factors of each product so that the pupil can set up any two factors and his answer, check the answer with the signal, and then check all factors of the answer. Thus the pupil checks his own work and becomes familiar with all the factors which produce each and every product.

A further feature of the invention includes a display of all products on the shield and so associated with the signal that each answer can be double checked therewith. The production of an improved and relatively simple educational device of this nature and embodying these features comprises a further object of the invention.

Figure 1:
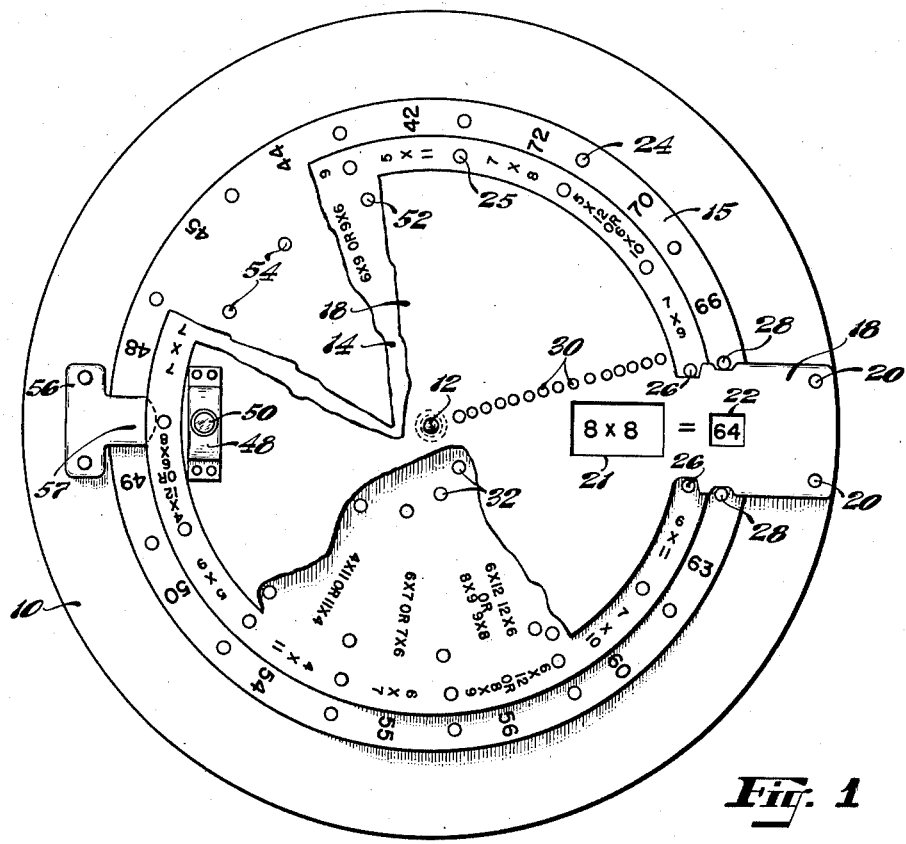
Figure 2:
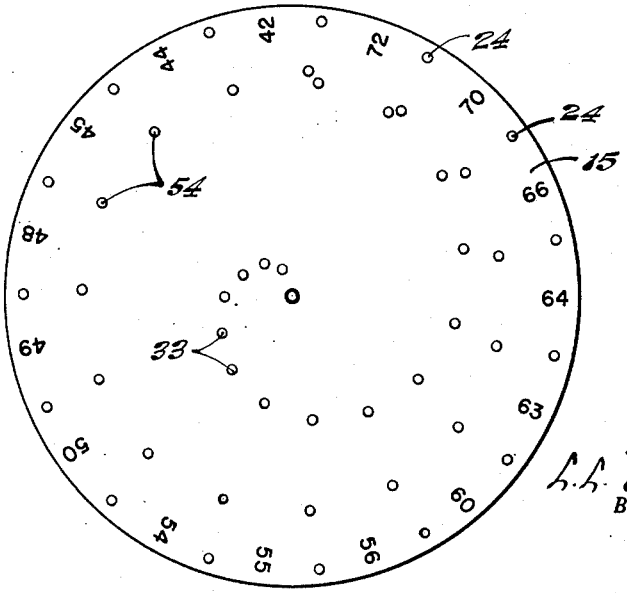
Figure 3:
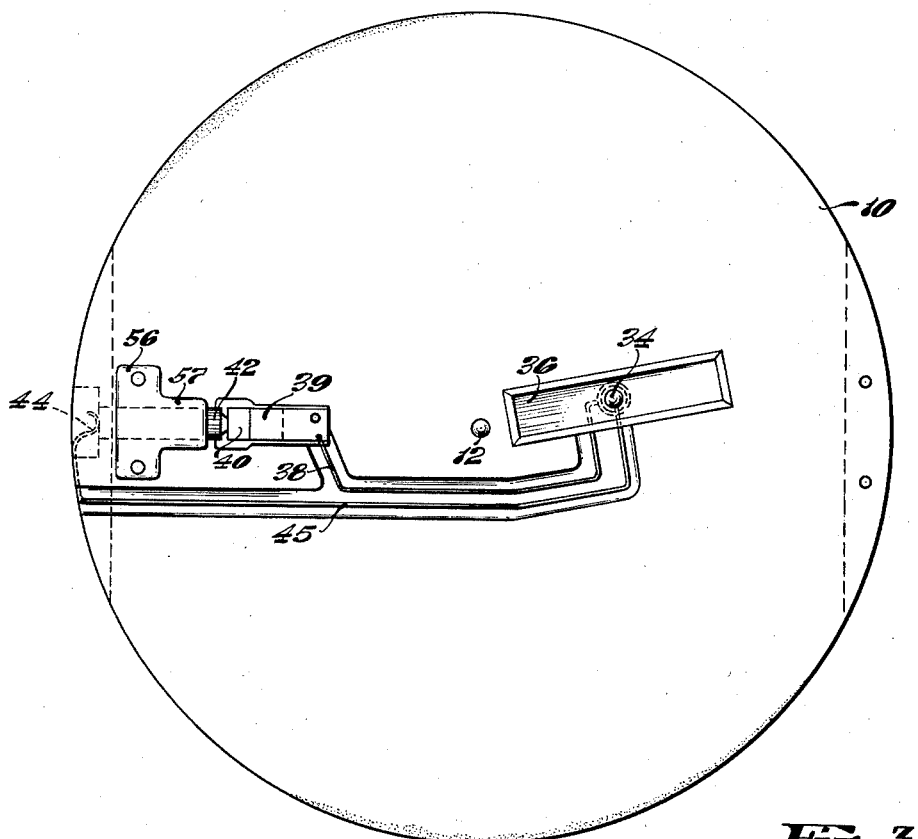
Figure 4:
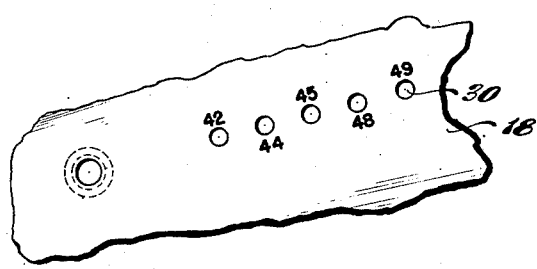
Figure 10:
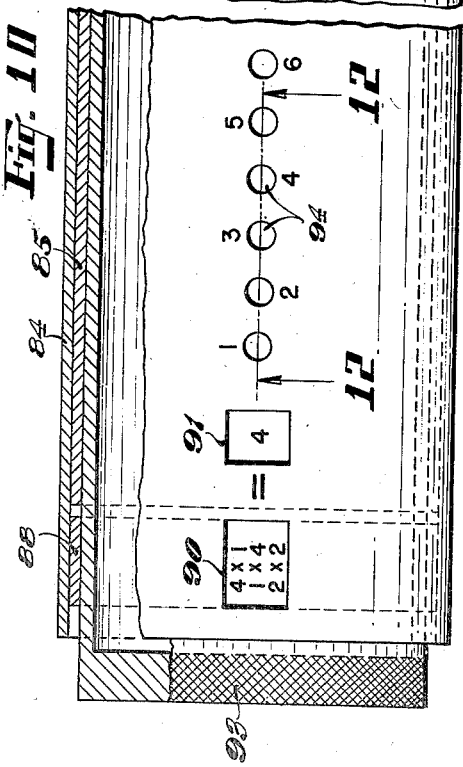
Figure 11:
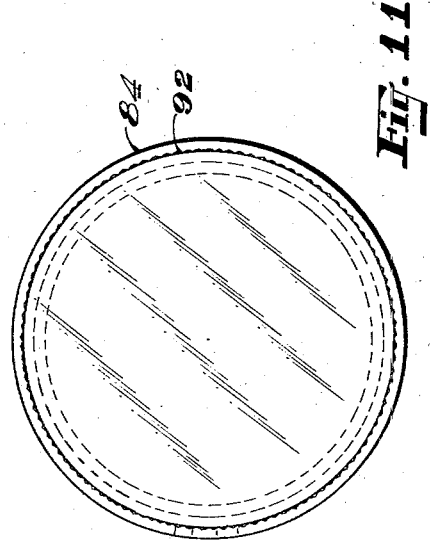
Figure 12:
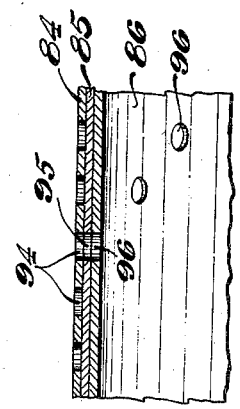

These and other features of the invention will be best understood and appreciated from the following description of preferred embodiments of our invention selected for purposes of illustration and shown in the accompanying drawings in which, Fig. 1 is a plan view, partially broken away, of a device embodying our invention, Fig. 2 is a plan view on a smaller scale of the bottom disk shown in Fig. 1, Fig. 3 is a plan view of the base, Fig. 4 is a fragmentary view of a modification, Fig. 5 is a front elevation of the device, Fig. 6 is a fragmentary plan view of a unit embodying the two disks shown in Fig. 1, Fig. 7 is a sectional view taken on line 7—7 of Fig. 6, Fig. 8 is a side elevation of a modified detail, Fig. 9 is a fragmentary plan view of a modified construction, Fig. 10 is a plan view, partially broken away, of a further modified construction, Fig. 11 is an end elevation thereof, and Fig. 12 is a sectional view taken on line 12—12 of Fig. 10.

Our invention is particularly adaptable to the teaching of multiplication and we have therefore herein illustrated and described the invention as thus employed. The device is illustrated at approximately normal size in Fig. 9.

Referring first to the form of invention shown in Figs. 1–7, 10 indicates a base constructed of wood or other suitable material or molded from papier-mâché or plastic composition. The base has a plane top surface provided with a centrally disposed peg 12. A unit 13 shown in Figs. 6 and 7 as comprising two disks 14 and 15 joined together by a centrally disposed hollow eyelet 16 is adapted to rest on the top surface of the base with the eyelet disposed over the peg. A shield 18 of any suitable material is adapted to be disposed over and rest on the unit 13. The shield is properly located and held in place by holes therein positioned to receive the peg 12 and two pins 20 carried by the base. The disks and shield can be slightly separated by thin washers if desired.

The multiplication table from the 1's to the 12's contains 59 products and we have discovered that the device can be simplified and the teaching facilitated by employing a plurality of units 13 each of which contains a definite part of the table and products. We have herein divided the table in four units 13. Unit No. 1 contains multiplication products 1 to 16; unit No. 2 contains multiplication products 18 to 40; unit No. 3 contains multiplication products 42 to 72; and unit No. 4 contains multiplication products 77 to 144. We have herein illustrated the No. 3 unit and the other three are of like nature. The employment of the units 13 also permits the beginner to start with the simplest unit No. 1 and go on to the other units as he progresses.

The bottom disk 15 of the unit 13 has the products 42 to 72 equally disposed anti-clockwise about its margin. The top disk 14 has the factors which produce these products equally disposed clockwise therearound, including an inner portion covered by the shield 18 and a visible marginal portion not thus covered (Fig. 1). The shield is provided with a window 21 therein for exposing the normally hidden problems and with a window 22 for exposing one of the products. The disk 15 is provided with a hole 24 midway between adjacent products for receiving a disk rotating stylus held like a pencil in the operator's right hand. The disk 14 is provided with a like hole 25 between adjacent visible problems at the exposed margin. The problems at the margin correspond to the adjacent problems beneath the shield. When it is desired to move a selected problem to the window 21 the stylus is placed in one of the holes 25 adjacent to the selected problem and the disk 14 is rotated until the stylus strikes a stop 26. The upper stop is for the upper hole and the lower stop is for the lower hole, it being thus possible to rotate the disk in either direction. The disk 15 is rotated in like manner to two stops 28 to bring a selected product to the window 22.

The unit 13 embodies fifteen problems and answers and the shield 18 has a like number of holes or windows 30 radiating outwardly. As indicated in Fig. 4, the innermost hole corresponds to the product 42 and the disks 14 and 15 have like holes 32 and 33 registering therewith when problem 6×7 is at a window 21 and product 42 is at the window 22. The second hole corresponds to product 44 and the remaining holes to the other products in like manner. The disks 14 and 15 are provided respectively with the holes indicated at 32 and 33 for registering with the holes 30 as the problems and corresponding answers are brought to the windows 21 and 22.

An electric lamp 34 and a reflector 36 are disposed in the top face of the base beneath the holes 30. A wire 38 connects one of the lamp terminals with the normally open contact 39 of a switch having a fixed contact 40. A battery 42 carried by the base engages the contact 40 at one end and a contact 44 carried by the base engages the other end of the battery. A wire 45 connects the contact 44 to the other terminal of the lamp. When the switch is closed the lighted lamp and reflector give a light signal at one of the windows 30 if two holes 32 and 33 are in register therewith to provide an opening entirely through the shield and disks.

The free end of the contact 39 is disposed beneath a plunger 46 carried in a frame 48 on the shield. The plunger is normally held in the raised position by a spring 49 and is provided with a head 50. The disks 14 and 15 are provided with holes at 52 and 54 so disposed that such holes are in alignment with the plunger when a problem and answer are at the windows 21 and 22. The plunger can then be depressed into engagement with and close the switch, but the plunger can pass through the disks to the switch only when the problems and answers are thus disposed.

A thin rigid plate 56 mounted on the base has an arm 57 extending inwardly over the bottom disk 15 and beneath the top disk 14. When rotating the disk 14, the disk 15 can be held from rotation by lightly pressing a finger of the left hand on the margin of the disk 15. When rotating the disk 15, the disk 14 can be held from rotation by lightly pressing a finger on the margin of the disk 14 over and against the arm 57.

The shield 18 and units 13 are freely removable from and replaceable on the base, and a pocket 60 can be provided in the base for receiving and storing the units 13 not being used.

The pupil having placed the selected unit 13 and the shield 18 on the base, as shown in Fig. 1, the operation is substantially as follows: The selected problem is set up by placing the stylus in a hole 25 adjacent to the problem and rotating the disk 14 until the stylus engages a stop 26. This places the selected problem at the window 21. The pupil then selects the product answer and rotates the disk 15 in like manner until the stylus contacts a stop 28, thus bringing the selected answer to the window 22. The disk 14 is held from rotation by light pressure of a finger thereon at the arm 57 during rotation of the disk 15. The pupil now checks his answer by depressing the plunger head 50 which closes the switch and lights the lamp 34. If the answer is correct a light signal will show at one of the holes 30. The pupil then double checks his answer by comparing it with the number at the signal hole 30 (Fig. 4). The two numbers are the same if the answer is correct.

It will also be noted that the portion of the disk 14 beneath the shield 18 is marked with all 1 to 12 factors of the products on the disk 15. Also, all such factors of each product are arranged to appear at the window 21. Thus after the pupil has checked and double checked his answer, he can observe at the window 21 all 1 to 12 factors that produce his answer product. The beginner quickly learns that whereas most products, beginning with 1, 2 and 3 have only two factors each, others, beginning with 4, have more than two factors. Our device shows the pupil all the factors from 1 to 12 for each product and he quickly and easily learns the various combinations that produce each product.

In Fig. 8 we have illustrated a mechanical signal that might be employed in lieu of the electric light. This mechanism comprises a bar 62 pivoted to the base at 63 and having one end beneath the plunger 46. The other end of the bar carries a head 64 having fifteen pins 66 resting on sponge rubber 67. The pins are disposed beneath the disks 14 and 15 and respectively in alignment with the holes 30. Swinging the bar anti-clockwise by the plunger 46 lifts the pins into contact with the disk 15. The pins that engage the disk will compress into the sponge rubber. Any pin located at aligned through holes will pass upwardly therethrough and serve as a signal to the pupil.

In Fig. 9 we have illustrated a modified construction embodying a unit of three disks 70, 71 and 72, together with a shield 74. The top disk 70 is marked at its margin with numerals providing the multiplier; the disk 71 is marked with numerals providing the multiplicand; and the disk 72 is marked with numerals providing the product. The shield has three windows 76, 77 and 78 for the multiplier, multiplicand and product. The disks are provided with stylus receiving holes 80 and the shield is provided with stops 81, all of which functions as already described above. Signal holes or windows 82 together with holes properly located in the disks are also provided as above described. For example, when the disks are in the position illustrated in Fig. 9, a through hole will be provided at the "48" product hole indicated at 82' and a signal light will show at this hole upon closing of the switch. The products can be marked on the shield at the holes 82, as indicated in Fig. 4.

While we prefer the relatively simple disk type of device above described, our invention can also be made in modified forms, as the cylindrical design shown in Figs. 10–12. An outer cylindrical shell 84 has two cylinders 85 and 86 nested thereinto. The problems are marked on a band 88 fixed to the cylinder 86 and are arranged to be displayed at a window 90 in the shell 84. The products are marked on the cylinder 85 and are arranged to be displayed at a window 91. The cylinders 85 and 86 can be rotated by end knobs 92 and 93. The shell is also provided with signal holes or windows 94 spaced longitudinally therealong and the cylinders are provided with holes 95 and 96 to register with the holes 94 as problems and correct answers are brought to the windows 90 and 91, as illustrated in Figs. 10 and 12. Suitable signals can also be provided at the windows 94 in the manner already described. The shell and cylinders can be of any suitable diameter and length and contain any desired number of problems and products, and the double checking numerals can be marked at the holes 94 as indicated in Fig. 10.

Having thus disclosed our invention what we claim as new and desire to secure by Letters Patent is:

1. An educational device comprising a shield having a plurality of windows therein, a plurality of sheets relatively movable about a common center beneath the shield, a plurality of mathematical answers disposed about said center on one of the sheets, means on other of the sheets providing a plurality of mathematical problems disposed about said center, the shield being windowed to expose therethrough selected problems and answers on said sheets, windows so disposed in the sheets that they come into alignment with one of the first named windows only when a corresponding answer and problem are brought into predetermined relation, means for producing an electric light signal through aligned windows on the shield and sheets when a corresponding answer and problem are brought into said predetermined relation, said means including an electric light switch beneath the sheets and the sheets having holes therethrough in predetermined relation to the problems and answers respectively, and a stem above and operative through said holes when in aligned relation for closing the switch.

2. An educational device comprising a shield having a plurality of small windows and a large window therein, two sheets relatively movable along a predetermined path beneath the shield, means providing a plurality of mathematical problems on the top sheet arranged to be selectively exposed through the large window, a plurality of mathematical answers on the bottom sheet, windows so disposed in the sheets that they come respectively into alignment with one of said small windows only when a correct answer is brought into predetermined relation with a problem at the large window, and a window in the shield adjacent to the large window and disposed to expose the answer in said predetermined relation.

3. The educational device defined in claim 2 plus an electric light beneath the sheets and small windows, a normally open switch for operating the light, means for closing the switch, and means permitting operation of the last named means only when an answer is brought into alignment with a problem at the large window.

4. An educational device comprising a base having a top surface with a centrally disposed peg, a plurality of disks on the base with centrally disposed holes engaged over the peg, a shield on the disks having a plurality of windows therein and radiating outwardly from the peg, a plurality of mathematical answers on one of the disks and a plurality of problems on other of the disks all disposed about the peg, and windows so disposed in the disks that one window in each comes into alignment with one of said windows in the shield when a corresponding answer and problem on said discs are brought into predetermined relation.

5. The educational device defined in claim 4 in which said answers are disposed around the margin of the bottom disk and the problems are on said other of the disks beneath the shield, the shield being windowed to expose therethrough selected problems on said other of the disks.

6. The educational device defined in claim 5 in which the problems are on the disk directly beneath the shield and are disposed in spaced relation around the centrally disposed hole in the disk, each of said problems comprising multiplication factors of one of said answers and including all 1 to 12 factors of said answers.

7. The educational device defined in claim 4 plus an electric lamp on the base beneath said windows in the shield, a lamp switch mounted on the base, and means cooperating with the switch and the disks for permitting closing of the switch only when a problem and answer are brought into a predetermined alignment.

8. The educational device defined in claim 4 plus a hollow eyelet rotatably joining said disks together at the centrally disposed holes to form them into a unit adapted freely to receive said peg through the eyelet.

9. The educational device defined in claim 8 in which said unit embodies two disks with the problems on the top disk and the answers on the other disk, each problem embodying two multiplication factors of one of said answers.

10. The educational device defined in claim 9 in which said answers are a fractional part of the 59 products of multiplication factors from 1 to 12, and in which all 1 to 12 factors of one of said answers is indicated at each problem on the top disk.

11. The educational device defined in claim 4 in which the disks are provided with holes for receiving a stylus for rotating the disks about the peg, and stops for cooperating with the stylus, the holes and stops being so disposed that a disk is brought into a predetermined position when the stylus disposed within one of said holes engages a stop.

12. The educational device defined in claim 4 in which each of said windows in the shield represents a definite answer and in which such answers are respectively marked on the shield at the windows, thus providing a double accuracy check when an answer and problem are brought into said predetermined relation.

13. An educational device comprising a shield having a plurality of windows therein, a plurality of sheets relatively movable about a common center beneath the shield, a plurality of mathematical answers disposed about said center on one of the sheets, means on other of the sheets providing a plurality of mathematical problems disposed about said center, the shield being windowed to expose therethrough selected problems and answers on said sheets, windows so disposed in the sheets that they come into alignment with one of the first named windows only when a corresponding answer and problem are brought into predetermined relation, one of the sheets being provided with holes for receiving a stylus for moving the sheet about said center, and a stop for cooperating with the stylus, the holes and stop being so disposed that the sheet is brought into a predetermined position when the stylus disposed within one of said holes engages the stop.

LAWRIE L. WITTER.
OSCAR ROBERT DECKERT.

REFERENCES CITED

The following references are of record in the file of this patent:

UNITED STATES PATENTS

| Number | Name | Date |
| --- | --- | --- |
| 1,699,289 | Gleason | Jan. 15, 1929 |
| 1,932,443 | Britsch | Oct. 31, 1933 |
| 1,974,901 | Stadler | Sept. 25, 1934 |
| 2,507,215 | Miltenberg et al. | May 9, 1950 |
| 2,507,223 | Rosenfeld | May 9, 1950 |

FOREIGN PATENTS

| Number | Country | Date |
| --- | --- | --- |
| 9,704 | Great Britain | Apr. 24, 1912 |
| 45,507 | Austria | Jan. 10, 1911 |